P. H. BRINK.
Preservation of Salted Cod Fish.
No. 229,368. Patented June 29, 1880.
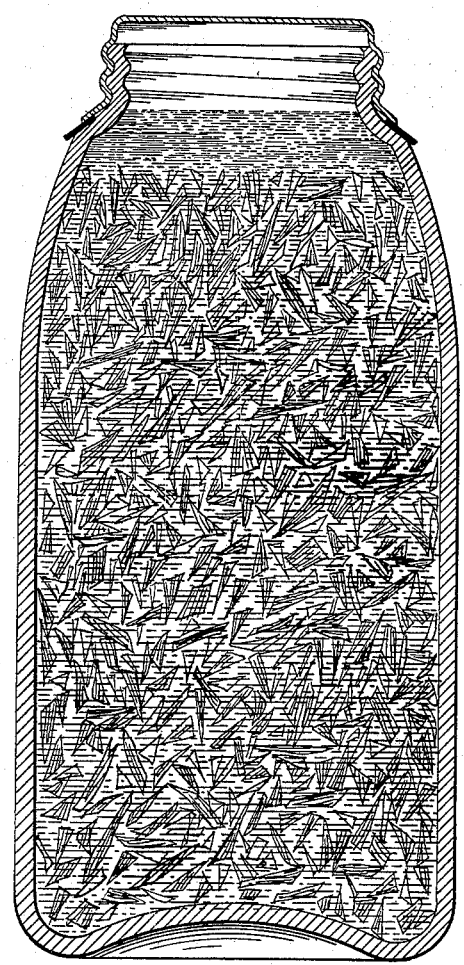
Witnesses-
H. F. Parker,
Chas H. Dorcat
Inventor-
Peter. H. Brink.
per- James A. Whitney
Atty-

UNITED STATES PATENT OFFICE.

PETER H. BRINK, OF ELIZABETH, NEW JERSEY, ASSIGNOR TO PETER C. SCHUYLER, OF NEW YORK, N. Y.

PRESERVATION OF SALTED CODFISH.

SPECIFICATION forming part of Letters Patent No. 229,368, dated June 29, 1880.

Application filed November 29, 1879.

*To all whom it may concern:*

Be it known that I, PETER H. BRINK, of Elizabeth, in the county of Union and State of New Jersey, have invented an Improvement in the Preservation of Salted Codfish, of which the following is a specification.

Dried salt codfish, as is well known, provides a cheap and nutritious article of food, fully available during cold weather, but which rapidly spoils and turns red in a warm atmosphere. For this reason it is not generally kept for sale during summer by provision-dealers who guarantee the quality of their goods, and is not exported in any considerable quantity to the southern states of this country, or to other regions having a warm climate.

It has long been desirable, therefore, that some method of preserving dried and salted codfish during warm weather should be devised.

I have found, by my experiments, that to protect the salted and dried codfish against the change or decay aforesaid three things are necessary—viz: first, the placing of the material in saturated brine for the double purpose of excluding the contact of atmospheric air and of maintaining the preservative action of the salt upon the material in the intensest degree; second, the comminution of the material, in order that all parts thereof may be equally subjected to the action of the brine, as aforesaid, and in order also that the air ordinarily confined in the interstices of the material may be thoroughly expelled and excluded therefrom by the brine; third, the confinement of the material and the brine covering and surrounding the same in a vessel closed sufficiently tight to practically prevent the evaporation of water from the brine, which evaporation, if suffered to occur, would quickly expose the material to atmospheric action and destroy the utility of the process.

The drawing is a sectional view, designed to illustrate the manner in which my said invention is carried into effect.

In the practice of my invention, I comminute the codfish, by picking, grinding, or other suitable means, into a finely divided or shredded condition. I then place it in a suitable jar, can, or vessel, A, and then pour into the latter a brine or saturated solution of common salt, until the shredded material is wholly immersed in and covered by the said brine, whereupon the vessel is closed by a cork or cap, or other appropriate device.

What I claim as my invention is—

The herein-described process of preserving dried salt codfish during hot weather, by placing the same, in a comminuted or shredded condition, in a saturated solution of common salt, in a vessel closed to prevent evaporation, all substantially as and for the purpose herein set forth.

PETER H. BRINK.

Witnesses:
 THOS. J. FARRELL,
 CHAS. H. DOXAT.